Figure 1:
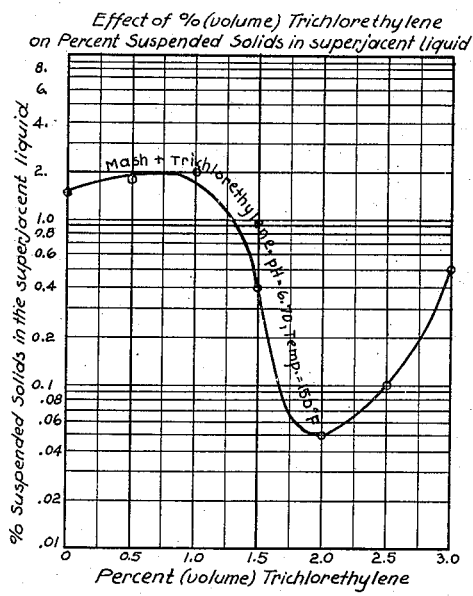

Feb. 15, 1949.      A. J. STROHMAIER ET AL      2,461,938
METHOD OF CLARIFYING MASH
Filed Nov. 16, 1944

INVENTOR.
Alfred J. Strohmaier
Clifton L. Lovell
BY Arthur J. Robert
atty

Patented Feb. 15, 1949

2,461,938

UNITED STATES PATENT OFFICE 2,461,938

METHOD OF CLARIFYING MASH

Alfred J. Strohmaier, Louisville, Ky., and Clifton L. Lovell, West Lafayette, Ind., assignors to Joseph E. Seagram & Sons, Inc., Shively, Ky., a corporation of Indiana Application November 16, 1944, Serial No. 563,784

15 Claims. (Cl. 210—42.5)

In the manufacture of butadiene, one of the principal ingredients used in the manufacture of the new synthetic elastomers, it has been proposed to ferment an acid hydrolyzed corn mash to a butadiene intermediate, namely 2,3 butanediol. Once a clear effluent, either in the form of an unfermented mash or a fermented beer, is obtained, it can be easily processed to butadiene. The production of a clear effluent from acid hydrolyzed corn mash and other acid or malt hydrolyzed grain mashes, such as distillery mashes, in a manner sufficiently inexpensive to justify use on a commercial scale, presents a difficult problem.

The present invention relates to this problem and has for its principal object the provision of a novel and inexpensive solution for it.

Another important object of the invention is to provide a novel method of treating the mash which facilitates its effective clarification by settling or centrifuging operations.

A further important object of the invention is to provide a clarification method which may advantageously be employed prior to fermentation to produce a clear effluent capable of being fermented and further processed to butadiene or alcohol, as the case may be, without further clarification.

Broadly speaking, the invention resides in the discovery that when the mash is treated with a controlled quantity of a relatively heavy wetting solvent, that is to say a solvent having a low surface tension and a high specific gravity, a clear effluent may be separated under controlled condition of pH and temperature by centrifuging the treated mash or allowing it to settle. More specifically, the invention comprises treating the mash with a controlled quantity of a halogenated hydrocarbon, of either the aliphatic or aromatic types, adjusting the pH and temperature of the mash to predetermined values and then producing a clear effluent by a settling or centrifuging operation. While the invention is applicable to grain mashes generally, for the sake of clarity, it is hereinafter specifically described in connection with an acid hydrolyzed unfermented corn mash for butanediol production purposes.

Figure 2:
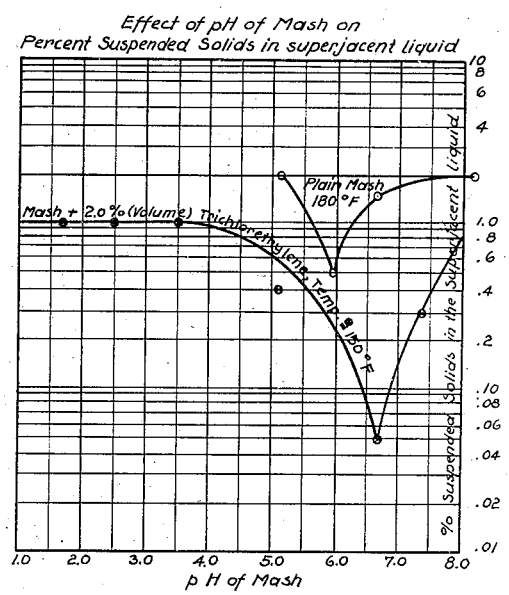
Figure 3:
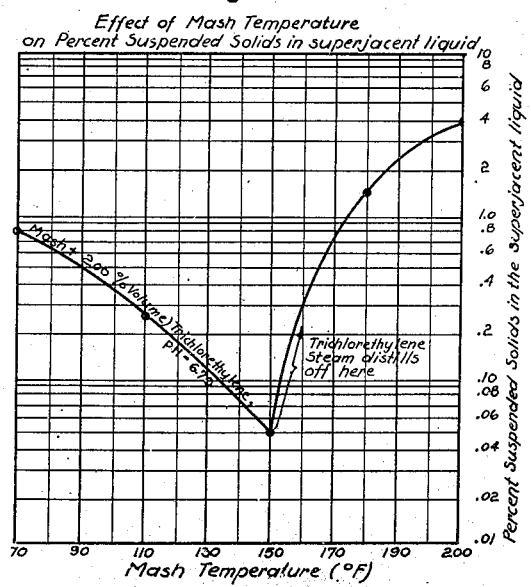

In the drawing:

Figures 1, 2 and 3 are graphs illustrating the effect, on the ease of clarifying an acid hydrolyzed corn mash for butanediol production purposes, of different amounts of trichlorethylene, of different pH values of the mash, and of different temperatures of the mash, respectively.

In carrying out the invention, an acid hydrolyzed corn mash may be prepared, cooked and hydrolyzed in the customary way. One representative process, which is of a continuous nature, comprises: grinding the corn continuously in a roller mill; continuously mixing the ground corn with water and sulfuric acid in a slurry tank to form an 0.2 normal suspension; pumping the suspension through a steam jet heater which, by means of 95 pound steam, more or less instantaneously raises the temperature of the suspension to 325° F.; maintaining this temperature by holding the mash under pressure for 5 minutes in a holding vessel; neutralizing the resulting cook with calcium carbonate; and cooling the neutralized cook first to a temperature corresponding to atmospheric pressure by discharging it into a flash cooler at atmospheric pressure and second to some desired lower temperature by passing it through a heat exchanger. The conversion of starches to fermentable sugar is virtually complete by the time the material is discharged from the heat exchanger. During the performance of the process, the rates of flow of the corn, water and steam are so adjusted as to produce a 40 to 44 gallon-per-bushel mash. This results in a dissolved sugar content of approximately 10% with the suspended solids content totaling 1.7 to 2.2%.

In accordance with our invention a controlled quantity of a halogenated aliphatic or aromatic hydrocarbon is added to the mash. The hydrocarbon may be halogenated with fluorine, chlorine, bromine or iodine which, in the order named, range from light to heavy. Where weight alone is the determining factor, the heavier halogens or large numbers of the lighter halogens per hydrocarbon molecule are naturally preferred. From the standpoint of economy, chlorine and bromine are preferred in the order named since they are the cheapest. Furthermore, while a multitude of halogenated hydrocarbons may be employed such as hexachlorpropylene, polychlorpropane, tetrachloroethylene, hexachlorbutadiene, carbon tetrachloride, tribromoethylene, and alpha, beta-dibromoethylene, for the sake of clarity, the present invention will be further described with trichloroethylene as the specific treating agent employed.

The amount of trichloroethylene preferably is 2% by volume. This amount is chosen because it produces maximum clarification as will be seen from the curve of Figure 1. However, it will be appreciated that the amount employed may vary and still obtain useful results although 2% is recommended for optimum results.

The pH of the mash should be controlled to secure optimum separation as indicated in Figure 2. With trichloroethylene, the optimum pH approximates 6.7. Here again, however, a variation in pH from 6.0 to 7.2 is well within a wider range in which useful results are secured. For pH control an alkali metal compound or alkaline earth metal compound may be employed.

The temperature of the mash must likewise be controlled for optimum results as indicated in Figure 3. With trichlorethylene the optimum mash temperature at atmospheric pressure is 150° F. There is a progressive increase in the effectiveness of the separation as the mash temperature progressively rises from room temperature up to 150° F. Beginning with this temperature, however, any further increase is accompanied by a decrease in effectiveness because the treating agent begins to distill off. Accordingly, it will be appreciated that, if the separation is effected under super-atmospheric pressure conditions, it will be possible to employ higher mash temperatures and, with such temperatures, there is every reason to expect even more effective separation. Temperatures lower than 150° F., for trichloroethylene, may, of course, be employed and useful results obtained. Whatever agent is employed, it will usually be desirable to have the mash temperature at a predetermined value just short of that at which such agent begins to distill off.

In applying the invention to the normal practice of cooking, neutralizing, cooling and fermenting, the mash, the neutralized cook may conveniently be cooled to the appropriate treating temperature at which time the pH can be adjusted. With the mash at predetermined values of pH and temperature the predetermined addition of the heavy wetting solvent is incorporated and thoroughly dispersed. After dispersion, the mash may be permitted to settle or be subjected to a centrifuging operation. In either event, a clear liquid will be obtained. The particular action which occurs is not definitely known but it is probably due to the combination of low surface tension, excellent solvent action and high specific gravity. Due to the first two characteristics, the agent probably displaces the water and corn oil on the surface and in the interstices, of the solids. By virtue of the third characteristic, there is an increase in the apparent specific gravity of the mash particles which induces extremely rapid settling particularly when subjected to centrifugal action. Since the effectiveness of these agents vary with different types of mashes, the wetting and displacing phenomena apparently are due to some selected form of action which depends upon certain unknown characteristics of the suspended particles.

The use of halogenated hydrocarbons, instead of the usual clarifying agents, such as bentonite, for example, offer some definite advantages. These chemicals are immiscible with water and can therefore be easily recovered, from the clarified effluent and the separated solids, by flashing or steam distillation. Consequently, the final products obtained are devoid of contaminants while the treating agents upon recovery, can be reused. With respect to an acid hydrolyzed mash, another advantage is that the effective pH range, for clarification purposes, is close to the neutral point. This obviates drastic changes in the pH and minimizes corrosion difficulties encountered where the pH of the mash is rendered highly acid.

The invention is applicable to unfermented and fermented acid or malt hydrolyzed corn or grain mashes. But, as indicated above, the action of the heavy wetting solvents varies with different mash conditions. For example, it is much more effective with unfermented mashes than it is with a fermented mash or beer. This may be seen from Table 1 which deals with the effect of different treating agents on each of three 150° F. mashes, namely: mash A, an unfermented acid hydrolyzed corn mash diluted to 90-94 gallons-per-bushel instead of 40-44 gallons-per-bushel and having a pH of 5.76; beer B, a fermented acid hydrolyzed corn beer having a pH of 5.6; and mash C, an unfermented acid hydrolyzed corn mash diluted to 40-44 gallons-per-bushel and having a pH of 6.10, this mash being identical to mash A except that it is more concentrated or less diluted and has a higher pH.

The data in Table 1 were obtained by dividing each mash into a number of identical samples and processing each sample as follows: place a pair of treated or untreated samples, as the case may be, in the opposed graduated centrifuge tubes of a Clay-Adams "Senior" variable speed centrifuge having a radius of 7 inches from the center of the centrifuge to the outer end of each centrifuge tube and rotate at 2,000 R. P. M. for periods ranging from ten seconds (10″) to seventy seconds (70″) to settle the solids and thus separate them from the superjacent liquid; decant the superjacent liquids from each centrifuge tube; and measure the solids content in each decanted liquid. To effect a quick measurement, we placed the decanted liquid into a DeLaval centrifuge having a graduated bowl, rotated it at 18,000 R. P. M. to settle the remaining solids, applying full power to the centrifuge for 2 minutes, allowing it to coast for 20 seconds (20″) and bringing it to rest in the next 30 seconds (30″), and then read the solid content directly from the graduated bowl in terms of volume per cent. The Clay-Adams centrifuge subjects the liquid and solids to a centrifugal force equal to 820 times gravity, while the DeLaval centrifuge accounts for a force of 30,000 times gravity and, for the most part, settles all of the remaining solids. Table 1 follows:

PILOT PLANT CORN MASHES AND BEER

*Effect of halogenated hydrocarbons on the per cent suspended solids remaining in the superjacent liquid after centrifugation at 2000 R. P. M. in the Clay-Adams test tube centrifuge*

| Chemical treating Agents (2.0% of mash volume) | 10″ | 20″ | 40″ | 60″ | 70″ |
| --- | --- | --- | --- | --- | --- |
| | A | A | A | A | A |
| none | 3. | 1.5 | .6 | .4 | .3 |
| hexachlorpropylene | .045 | .03 | .02 | .015 | .01 |
| polychlorpropane | .1 | .03 | .018 | .018 | .01 |
| tetrachloroethylene | .1 | .04 | .025 | .02 | .01 |
| hexachlorbutadiene | .1 | .04 | .02 | .02 | .02 |
| trichloroethylene | .2 | .04 | .025 | .02 | .02 |
| carbon tetrachloride | .25 | .07 | .03 | .02 | .018 |
| | B | B | B | B | B |
| none | 7. | 5 | 3.5 | 3 | 2.5 |
| hexachlorpropylene | 3. | 1.5 | 1.2 | 2 | 1.2 |
| polychlorpropane | 2.5 | 1.2 | 1.0 | 1.0 | 1.0 |
| tetrachloroethylene | 4 | 1.5 | 1.0 | 1.5 | 1.2 |
| hexachlorbutadiene | 2.8 | 1.5 | 1.0 | 1.8 | 1.2 |
| trichloroethylene | | | | | |
| carbon tetrachloride | 4 | 1.5 | 1.2 | 1.5 | 1.2 |
| | C | C | C | C | C |
| none | 7 | 5 | 4 | 3 | |
| tribromoethylene | 2 | .3 | .06 | .035 | .02 |
| alpha, beta-dibromo-ethylene | 2 | .6 | .3 | .08 | .06 |

Table 1, with respect to unfermented dilute mash A, for example, indicates that the Clay-Adams centrifuge left 3% solids, by volume, in the superjacent liquid of the untreated mash after 10 seconds (10″) centrifugation at 2,000 R. P. M. On the other hand, when the mash was provided with any of the six treating agents listed and otherwise identically processed, a solids content was left in the superjacent liquid ranging from 0.045% (or 1/67 of 3%) up to .25% (or 1/12 of 3%). Where the same mash is centrifuged for periods progressively longer than 10 seconds (10″), the solids content in untreated mash progressively decreases while the solids content in treated mash likewise progressively decreases, the latter remaining at values less than one-twelfth of the former.

The unfermented but more concentrated mash C, produces results similar to mash A when it is centrifuged for intervals longer than 10 seconds (10″).

The solids content of the fermented mash B is consistently reduced by the treatment, but the results here are not as pronounced as they are where the mash is unfermented.

It will be appreciated that the specific gravity of the hydrocarbon clarifying agent must be greater than water if it is to displace water and thereby increase the apparent specific gravity of the mash solids. Also, since the effectiveness of the clarifying agent decreases when it begins to distill off from the mash, the operating conditions must be such as to hold the clarifying agent in the liquid phase.

Having described our invention, we claim:

1. A method of clarifying a hydrolized grain mash solution wherein the apparent specific gravity of the mash solids is increased to facilitate the mechanical separation of the solids from the liquids, comprising: dispersing in the mash a halogenated hydrocarbon, having a specific gravity greater than water, to increase the apparent specific gravity of the solids under operating conditions in which the halogenated hydrocarbon remains in liquid form; and thereafter mechanically separating the liquids from the solids.

2. The method of claim 1 wherein the mash is an acid hydrolyzed corn mash.

3. The method of claim 1 wherein the mash is unfermented.

4. The method of claim 1 wherein the mash is an unfermented acid hydrolyzed corn mash for use in the production of butanediol.

5. The method of claim 1 wherein the halogenated hydrocarbon is used in an amount approximating 2% by volume.

6. The method of claim 1 wherein the mash is adjusted to a predetermined pH.

7. The method of claim 1 wherein the mash is adjusted before the separating action to a predetermined temperature substantially above room temperature and below the temperature at which the halogenated hydrocarbon begins to distill off.

8. The method of claim 1 wherein the mash, prior to the separating action, is adjusted to a predetermined pH and to a predetermined temperature substantially above room temperature and below the distillation temperature of the halogenated hydrocarbon in the mash.

9. A method of clarifying a hydrolized grain mash solution wherein the apparent specific gravity of the mash solids is increased to facilitate the mechanical separation of the solids from the liquids, comprising: adjusting the mash to a predetermined pH and to a predetermined temperature; dispersing in the mash a liquid halogenated hydrocarbon, having a specific gravity greater than water, to increase the apparent specific gravity of the solids, under operating conditions in which the hydrocarbon remains in liquid form; and thereafter separating the liquids from the solids.

10. The method of claim 9 wherein the pH is within the range of 6.0 and 7.2.

11. The method of claim 9 wherein the temperature of the mash is substantially above room temperature and below the distillation temperature of the halogenated hydrocarbon in the mash.

12. The method of claim 9 wherein the volume of the halogenated hydrocarbon approximates 2% of the volume of the mash.

13. The method of claim 9 wherein the pH is adjusted to the range of 6.0 to 7.2, and the temperature is adjusted to a value substantially above room temperature and below the distillation temperature of the halogenated hydrocarbon in the mash.

14. The method of claim 9 wherein the pH approximates 6.7, the temperature approximates 150° F., the halogenated hydrocarbon is trichlorethylene in an amount approximating 2% by volume and the mash solids are separated by centrifugal force.

15. A method of clarifying a grain mash containing dispersed solids which comprises: dispersing in the mash a halogenated hydrocarbon having a specific gravity greater than water, in such proportion and under conditions of temperature and hydrogen ion concentration to increase the apparent specific gravity of the dispersed solids and maintain the halogenated hydrocarbon in liquid phase; and thereafter separating the solids from the mash.

ALFRED J. STROHMAIER.
CLIFTON L. LOVELL.

REFERENCES CITED

The following references are of record in the file of this patent:

UNITED STATES PATENTS

| Number | Name | Date |
|---|---|---|
| 1,901,321 | Munz | Mar. 14, 1933 |
| 2,266,719 | Buxton | Dec. 16, 1941 |
| 2,306,776 | Buxton | Dec. 29, 1942 |
| 2,316,241 | Heimann | Apr. 13, 1943 |
| 2,320,486 | Stuart | June 1, 1943 |